US010560422B2

United States Patent
Pandrangi et al.

(10) Patent No.: US 10,560,422 B2
(45) Date of Patent: Feb. 11, 2020

(54) ENHANCED INTER-NETWORK MONITORING AND ADAPTIVE MANAGEMENT OF DNS TRAFFIC (71) Applicant: VERISIGN, INC., Reston, VA (US)

(72) Inventors: Ramakant Pandrangi, Lansdowne, VA (US); Denis Phillips, Herndon, VA (US)

(73) Assignee: VERISIGN, INC., Reston, VA (US)

(*) Notice: Subject to any disclaimer, the term of this patent is extended or adjusted under 35 U.S.C. 154(b) by 180 days.

(21) Appl. No.: 15/193,806

(22) Filed: Jun. 27, 2016

(65) Prior Publication Data

US 2016/0380960 A1 Dec. 29, 2016

Related U.S. Application Data (60) Provisional application No. 62/185,703, filed on Jun. 28, 2015.

(51) Int. Cl.
*G06F 15/173* (2006.01)
*H04L 29/12* (2006.01)
(Continued)

(52) U.S. Cl.
CPC .......... *H04L 61/1511* (2013.01); *H04L 43/04* (2013.01); *H04L 47/16* (2013.01);
(Continued)

(58) Field of Classification Search
CPC ..... H04L 43/04; H04L 63/10; H04L 63/1441; H04L 63/1491; H04L 63/20; H04L 61/1511; H04L 67/2814; H04L 47/16; H04L 61/106
(Continued)

(56) References Cited

U.S. PATENT DOCUMENTS

2008/0163354 A1* 7/2008 Ben-Shalom ....... H04L 63/1441
726/12
2010/0251329 A1* 9/2010 Wei ..................... H04L 63/1408
726/1
(Continued)

FOREIGN PATENT DOCUMENTS

WO     WO 2015152869 A1 * 10/2015  ......... H04L 67/2814

OTHER PUBLICATIONS

Extended European Search Report Application No. 16176731.4 dated Oct. 27, 2016, 8 pages.
(Continued)

*Primary Examiner* — Liang Che A Wang
*Assistant Examiner* — Johnny B Aguiar
(74) *Attorney, Agent, or Firm* — Artegis Law Group, LLP (57) ABSTRACT

Systems and methods for enhanced monitoring and adaptive management of inter-network Domain Name System ("DNS") traffic include an information capture device in a monitored network. The information capture device receives a redirected connection request originated by a client machine in the monitored network in response to a modified DNS answer from a recursive name server outside of the monitored network, captures detailed information associated with the redirected connection request that is inaccessible to the recursive name server, and sends the captured information to a data storage accessible to the recursive name server for storage as augmented DNS data associated with the client machine and/or the redirected connection request. The information capture device further provides, in response to the redirected connection request, an adaptive answer generated based on the augmented DNS data to the client machine.

19 Claims, 5 Drawing Sheets

(51) Int. Cl.
  *H04L 12/26* (2006.01)
  *H04L 12/801* (2013.01)
  *H04L 29/06* (2006.01)
(52) U.S. Cl.
  CPC ........ *H04L 61/106* (2013.01); *H04L 63/1441* (2013.01); *H04L 63/1491* (2013.01)
(58) Field of Classification Search
  USPC .............. 709/217, 219, 223, 224, 225, 238; 726/22, 23
  See application file for complete search history.

(56) References Cited

U.S. PATENT DOCUMENTS

| | | | |
|---|---|---|---|
| 2011/0246634 | A1 | 10/2011 | Liu et al. |
| 2012/0158969 | A1 | 6/2012 | Dempsky et al. |
| 2012/0303808 | A1* | 11/2012 | Xie ................... H04L 63/0236 709/225 |
| 2014/0344890 | A1 | 11/2014 | Warrick et al. |
| 2015/0180892 | A1* | 6/2015 | Balderas ............. H04L 63/1416 726/11 |
| 2015/0256508 | A1* | 9/2015 | Townsend ............... H04L 61/20 709/245 |
| 2016/0036848 | A1* | 2/2016 | Reddy ................. H04L 63/0227 726/22 |
| 2016/0036857 | A1* | 2/2016 | Foxhoven .............. H04L 63/20 726/1 |
| 2016/0285822 | A1* | 9/2016 | Adams .................... H04L 63/02 |

OTHER PUBLICATIONS

Choi et al., "Botnet Detection by Monitoring Group Activities in DNS Traffic", Seventh International Conference on Computer and Information Technology, IEEE Computer Society, Oct. 16-19, 2007, pp. 715-720.
Extended European Search Report for Application No. 16176731.4 dated Mar. 22, 2017, 13 pages.

* cited by examiner

ENHANCED INTER-NETWORK MONITORING AND ADAPTIVE MANAGEMENT OF DNS TRAFFIC

CROSS REFERENCE TO RELATED APPLICATIONS

The present application claims the benefit of U.S. Provisional Patent Application No. 62/185,703 filed on Jun. 28, 2015, entitled "Enhanced Inter-Network Monitoring of and Adaptive Response to Redirected DNS Traffic," by Ramakant Pandrangi and Denis Phillips, the contents of which are hereby incorporated herein by reference in its entirety.

FIELD

This invention relates to enhanced inter-network monitoring and selective redirection of network traffic, intra-network capture of information associated with the redirected network traffic, and adaptive management of the redirected network traffic based on the captured information.

BACKGROUND

In general, the DNS is the part of the Internet infrastructure that translates human-readable domain names into the Internet Protocol ("IP") numbers needed to establish Transmission Control Protocol ("TCP")/IP communication over the Internet. That is, DNS allows users to refer to web sites, and other resources, using domain names that are easier to remember, such as "www.example.com", rather than the numeric IP addresses, such as "123.4.56.78", assigned to computers on the Internet.

To find specific resources on the Internet, end-user applications can use the DNS resolution process. Aspects of the DNS resolution process are discussed below to aid in an understanding of the subject matter of the present application. The responsibility for operating a top-level domain ("TLD"), such as maintaining a registry of the second-level domains within the TLD, is delegated to a particular domain name registry. The registry is responsible for mapping domain names to IP addresses and resolving domain names through DNS servers that maintain such information in large databases, and operating one or more TLDs assigned to the registry.

The DNS servers map IP addresses to domain names in various TLDs, such as .com, .net, .edu, .tv, .co.uk, and the like. A single registry may be responsible for several TLDs. For example, the VERISIGN registry is responsible for .com and .net domains as well as many other TLDs. Resolving is the process by which domain names are matched with corresponding IP numbers. Resolving is accomplished by a combination of computing hardware and software that include name servers and resolvers utilizing DNS data to determine which IP numbers correspond to a particular domain name.

The DNS is maintained by a distributed database system, which uses the client-server model. Name servers serve as nodes of the distributed database. The DNS distributes the responsibility of assigning domain names and mapping those names to IP addresses by designating authoritative name servers for each domain. Because of the huge volume of DNS queries, the DNS resolution process allows for caching, which includes the local recording and subsequent consultation of the results of a DNS query, for a given period of time after a successful answer. How long a name server caches a DNS response is determined by a value called the time to live ("TTL"), which is generally set by the name server's administrator. Based on the DNS structure, as well as the caching function, there are two classifications typically applied to the name servers and resolvers, authoritative and recursive. An authoritative name server is a name server that gives original, definitive answers to DNS queries. Every domain name must be assigned a set of authoritative name servers that are responsible for resolving the domain name.

Caching name servers are recursive name servers that can cache DNS query results for a period of time specified by the TTL of the domain name record in question. Typically, caching name servers also implement the recursive algorithm necessary to resolve a given name starting with the root name server through to the authoritative name servers of the queried domain. Internet service providers ("ISPs") typically provide recursive and caching name servers that serve their end-users. These end-users can utilize local network routers that implement DNS caches and recursive resolvers to improve efficiency. The network routers or machines in the local networks can include DNS stub or forwarding resolvers, which essentially operate as a cache-less application to resolve DNS names into IP addresses. The DNS stub or forwarding resolvers forward DNS queries from an end-user to a name server configured to resolve DNS queries from the end-user and return the name server's response. If a forwarding or stub resolver queries a caching name server for a domain record that is being held by the caching name server before the domain record's TTL has expired, then the caching name server would reply with the cached resource record rather than re-retrieve it from the authoritative name server.

Recursive resolvers can be configured to block or redirect DNS queries from stub or forwarding resolvers for a variety of reasons, such as to prevent users from falling victim to malware sites, enforce company policies, etc. However, when recursive resolvers receive DNS queries from machines in different networks, the recursive resolvers can capture only limited information associated with the DNS queries and the querying machines.

BRIEF DESCRIPTION OF THE DRAWINGS

The accompanying drawings, which are incorporated in and constitute a part of this specification, illustrate implementations of the invention and together with the description, serves to explain the principles of the present disclosure. In the drawings.

DESCRIPTION OF EMBODIMENTS

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

The following general definitions will be used herein. Resolve: to translate or convert one or more domain names to one or more IP addresses. Resolver: a computer (or computers) issuing a DNS query in order to resolve a domain name. Name server: a computer (or computers) receiving DNS queries and answering the DNS queries directly or via resolvers against other name servers. Subnet: a group of IP addresses sharing octets of the IP address.

As noted above, a DNS name server in a first network can receive and respond to DNS queries originating in at least one discrete network with an address space distinct from the first network. Presently, when the DNS name server receives DNS queries that originated from machines in the discrete network and/or traversed certain types of intermediaries, the DNS name server can capture only limited information associated with the DNS queries. For instance, the DNS name server cannot uniquely identify which of the machines originated the DNS queries because the DNS name server is outside of the discrete network's address space and/or the DNS queries traversed at least one intermediary to reach the DNS name server. Types of intermediaries include network entities that can directly respond to or block DNS queries and/or mask or modify information associated with the DNS queries and their originating machines. Examples of network entities include firewalls, proxy servers, network address translators, caching resolvers, local forwarders, and the like. Examples of intermediaries include one or more network entities and a network containing one or more network entities. If detailed information associated with the DNS queries can be captured and utilized to augment data available to the DNS name server, then potential victims in the discrete network and bad actors can be better identified and the discrete network can be better protected against the bad actors.

Figure 1:
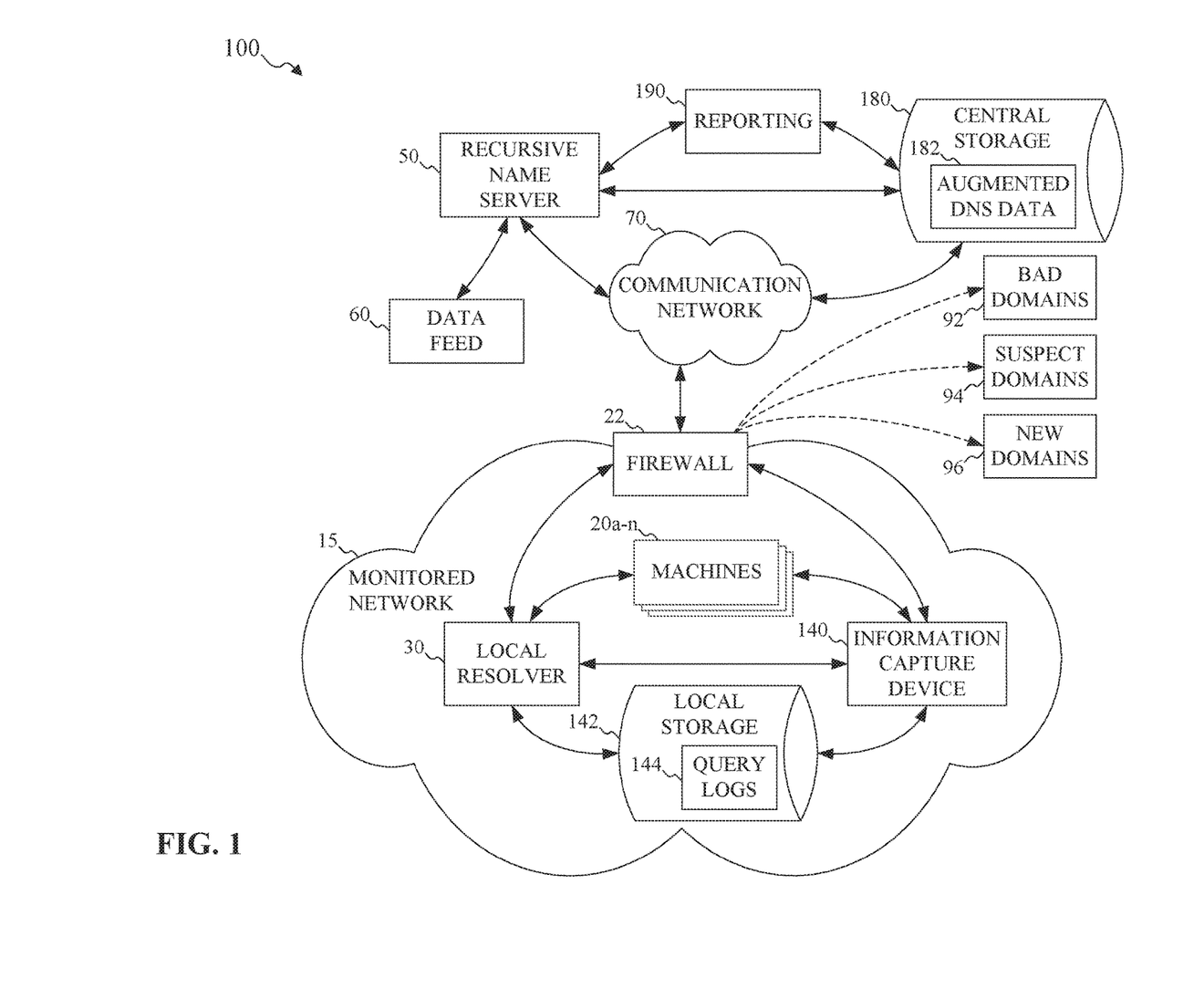
FIG. 1 is a block diagram of an example of a DNS data augmentation system that performs inter-network monitoring and selective redirection of DNS traffic, performs intra-network capture of information associated with network traffic resulting from the redirected DNS traffic, and adaptively manages the network traffic based on the captured information, consistent with the principles of the present disclosure.

Various embodiments of the present disclosure include data augmentation systems, methods, and articles of manufacture for monitoring and selectively redirecting DNS queries that originated in at least one discrete network with a distinct address space and/or traversed across intermediaries, performing intra-network capture of detailed information associated with network traffic resulting from the redirected DNS queries to provide captured information, and adaptively managing the network traffic based on the captured information. FIG. 1 illustrates an example DNS data augmentation system 100 that performs inter-network monitoring of DNS queries originating in at least one monitored network 15, selectively redirects network traffic resulting from the DNS queries to at least one information capture device 140 in monitored network 15, performs intra-network capture of information associated with the redirected network traffic, and adaptively manages the redirected network traffic based on the captured information. Information capture device 140 can be a physical or virtual appliance in monitored network 15. While FIG. 1 illustrates various components contained in DNS data augmentation system 100, FIG. 1 illustrates one example of a DNS system and additional components can be added and existing components can be removed.

Monitored network 15 includes multiple machines 20a-n and at least one local resolver 30 that machines 20a-n can query to resolve domain names, including domain names that do not resolve to information capture device 140. Machines 20a-n and information capture device 140 can be in different subnets or roots of monitored network 15. When a machine of machines 20a-n originate and transmit a DNS query to local resolver 30 seeking to resolve a domain name, local resolver 30 answers the machine with at least one DNS answer, which includes at least one IP address corresponding to the domain name, information capture device 140, a honeypot, and the like. The machine then transmit network traffic (e.g., at least one connection request) resulting from the DNS query to the IP address. Local resolver 30 includes any shared DNS resolver in monitored network 15 that provides resolution services to machines 20a-n, any of machines' 20a-n own DNS resolvers, or any combination thereof. Examples of local resolver 30 include a recursive resolver, a caching resolver, a stub resolver, a forwarding resolver, etc., or any combination thereof.

Local resolver 30 can receive the DNS query that seeks to resolve the domain name and determine whether or not the DNS query can be fully answered locally, for example, by local resolver 30 using relevant, cached DNS information that has not expired. If the DNS query cannot be fully answered locally, then local resolver 30 can forward the locally-unanswerable DNS query to a DNS name server outside of monitored network 15, receive at least one DNS answer responsive to the locally-unanswerable DNS query, and forward the DNS answer to the machine that originated the locally-unanswerable DNS query. Local resolver 30 can also cache the DNS answer for responding to subsequent DNS queries that seek to resolve the same domain name. Alternatively, if local resolver 30 determines that the DNS query can be fully answered locally, then local resolver 30 can answer the DNS query without contacting the outside DNS name server.

In various embodiments, DNS data augmentation system 100 includes at least one recursive name server 50 that functions as the outside DNS name server. Recursive name server 50 can be configured to resolve domain names in particular domains or zones, such as domain names in the ".com" and ".net" TLDs. Recursive name server 50 can also be configured to answer some or all DNS queries that originate in monitored network 15. As depicted in FIG. 1 and in accordance with various embodiments, recursive name server 50 is outside of monitored network 15, i.e., not in any discrete address space of monitored network 15. Recursive name server 50 is communicatively coupled to monitored network 15 via at least one communication network 70 and machines 20a-n in monitored network 15 via at least one firewall 22 or any other intermediary functioning as a gatekeeper for monitored network 15. Communication network 70 includes any combination of one or more wired or wireless communication networks, such as a cloud-based network ("cloud"), the Internet, a cellular network, a wide area network, a near-field communication link or network, a local area network, and the like, or any combination thereof.

Recursive name server 50 can be a cloud-based DNS resolver that is communicatively coupled via at least one cloud (e.g., communication network 70) to machines 20a-n in monitored network 15. With recursive name server 50 serving as a cloud-based resolver, DNS data augmentation system 100 simultaneously provide the benefits of a cloud-based DNS resolution service and access to information with the local scope and granularity of monitored network 15. While local resolver 30 and recursive name server 50 in FIG. 1 are each depicted as a single computing system or network entity (e.g., cloud-based resources), other embodiments can include multiple computing systems or network entities as one or more DNS resolvers and one or more recursive name servers designated to handle one or more domains or zones, respectively. Moreover, local resolver 30 and recursive name server 50 can be formed of hardware and/or software configured as described for responding to DNS queries. By way of non-limiting example, local resolver 30 and recursive name server 50 can run on physical machines such as personal computers, servers, workstations, mainframes, etc., and/or virtual machines running thereon, and/or can run on cloud-based resources.

In various embodiments, DNS data augmentation system 100 performs inter-network monitoring of DNS queries that originated in monitored network 15 to identify which of the DNS queries are suspicious, for example, for seeking to resolve one or more questionable domain names. More particularly, DNS data augmentation system 100 monitors the DNS queries, which are originated by one or more client machines of machines 20a-n in monitored network 15, and flags the DNS queries identified as suspicious. DNS data augmentation system 100 relies on various data sources, including at least one data feed 60, a local storage 142, a central storage 180, the administrator of monitored network 15, and the like, for information with which to identify suspicious DNS queries, such as one or more lists of the questionable domain names. The lists of questionable domain names include domain names (e.g., canonical names, aliases, delegation names, etc.) associated with questionable domains, examples of which include bad domains 92, suspect domains 94, new domains 96, and the like. The questionable domain names do not resolve to and/or are not associated with information capture device 140. Examples of bad domains 92 include domains flagged for to propagating malware, defrauding visitors, violating organizational policies, etc. Examples of suspect domains 94 include domains suspected of propagating malware, defrauding visitors, violating organizational policies, etc., such as domains with domain names misspelled to mimic well-known domain names, domains with owners that exhibit suspicious behavior, and the like. Examples of new domains 96 include domains that are newly registered or have recently changed ownership.

DNS data augmentation system 100 responds to the suspicious DNS queries differently from the DNS queries not deemed suspicious. More particularly, DNS data augmentation system 100 can selectively redirect only network traffic (e.g., connection requests) resulting from the suspicious DNS queries, but not network traffic resulting from non-suspicious DNS queries, to information capture device 140. DNS data augmentation system 100 utilizes recursive name server 50 and/or local resolver 30 to answer the suspicious DNS queries, for example, by responding to the client machines that originated the suspicious DNS queries with modified DNS answers that specify at least one IP address associated with information capture device 140, which is in monitored network 15, instead of IP addresses corresponding to the questionable domain names. Local resolver 30 can cache the modified DNS answers from recursive name server 50, and as long as the cached, modified DNS answers remain valid (e.g., corresponding TTLs not yet expired), local resolver 30 can answer subsequent identical DNS queries without having to query recursive name server 50. Accordingly, there exists a one-to-many relationship between the number of suspicious DNS queries answered by recursive name server 50 and subsequent similar queries answered by local resolver 30.

In response to the modified DNS answers, the client machines originate and transmit the redirected network traffic resulting from the suspicious DNS queries to information capture device 140, which performs intra-network captures of detailed information associated with the redirected network traffic and utilizes the captured information to adaptively respond to the redirected network traffic. The detailed information associated with the redirected network traffic, as well as detailed information associated with the DNS queries, are typically local in scope, i.e., are locally accessible only to network entities in monitored network 15, such as machines 20a-n, local resolver 30, and other network entities that share at least one discrete address space of monitored network 15. In contrast, the detailed information associated with the redirected network traffic and the DNS queries are not directly accessible to recursive name server 50 and other entities outside of monitored network 15.

In various embodiments, DNS data augmentation system 100 utilizes information capture device 140 to perform intra-network captures of the detailed information associated with the redirected network traffic to provide captured information. The captured information associated with the redirected network traffic includes attribute values for one or more attributes of the redirected network traffic, such as originator identifiers, destination and destination ports, protocols and protocol-specific information, timestamps indicating time of origination or transmission, and the like. DNS data augmentation system 100 stores the captured information associated with the redirected network traffic in one or more query logs 144 in local storage 142, as well as utilize the captured information to update augmented DNS data 182 in central storage 180, therefore making the detailed information available to and accessible by recursive name server 50 and other entities outside of monitored network 15.

The redirected network traffic can include connection requests, and information capture device 140 can capture detailed information associated with the connection requests to provide captured information, such as originator identifiers of the client machines that originated the connection requests, destination and destination ports specified in the connection requests, protocols and protocol-specific information specified in the connection requests, timestamps indicating the connection requests' time of origination or transmission, and the like. Each originator identifier uniquely identifies one of machines 20a-n in monitored network 15, for example, by including at least one internal source IP address or another identifier, such as a Media Access Control address. Examples of well-known destination ports include, for example, ports 80 and 8080 for Hypertext Transfer Protocol ("HTTP") and ports 25 and 587 for Simple Mail Transfer Protocol ("SMTP"). Protocol information, such as relevant protocols (e.g., HTTP, SMTP, etc.), can be used to capture protocol-specific information. Examples of protocol-specific information include HTTP headers, destination uniform resource locators ("URLs") and request uniform resource identifiers ("URIs"), user agents, SMTP mail subjects, SMTP bodies, etc.

In addition to storing the captured information associated with the redirected network traffic, query logs 144 and/or augmented DNS data 182 can archive captured information associated with the client machines' previous network traffic that had been redirected to information capture device 140. Archived information associated with previously-redirected network traffic can be aggregated by one or more attributes to obtain aggregate information. For example, connection requests that sought to resolve a subset (i.e., one, some or all) of the questionable domain names and have been redirected to information capture device 140 can be aggregated by originator identifier (e.g., made by the same subset of the client machines), destination (e.g., specifying the same destination), destination port (e.g., specifying the same destination port), protocol (e.g., specifying the same protocol), protocol-specific information (e.g., specifying the same protocol-specific information), timestamps (e.g., made during the same timeframe), etc., or any combination thereof. In doing so, DNS data augmentation system 100 can determine a number of connection requests made by the same subset of the client machines, specifying the same destination(s), specifying the same destination port(s), specifying the same protocol(s), specifying the same protocol-specific information, made during the same timeframe(s), etc., or any combination thereof. The timeframes, the subsets of the client machines, and the subsets of questionable domains can be defined based on one or more criteria, such as requirements for reporting 190 of augmented DNS data 182, configurations and statuses of monitored network 15 (or entities therein) and/or recursive name server 50, input from the administrator of monitored network 15, etc.

In various embodiments, DNS data augmentation system 100 integrates the detailed and aggregate information associated with the redirected network traffic to provide augmented information relevant to the redirected network traffic, which DNS data augmentation system 100 utilizes to update augmented DNS data 182 in central storage 180 and/or query logs 144 in local storage 142. DNS data augmentation system 100 obtains augmented information relevant to the redirected network traffic and utilizes information capture device 140 to adaptively respond to the redirected network traffic based on the augmented information. For example, in response to connection requests from the client machines, information capture device 140 can obtain and evaluate augmented information relevant to the connection requests. If a connection request from one of the client machines is granted, then information capture device 140 can connect with the client machine and a target machine and serve as a suitable type of intermediary between the client and target machines. Information capture device 140 can evaluate the augmented information to select the target machine and/or the suitable intermediary type (e.g., a gateway, a content-filtering proxy server, a honeypot, and the like). The target machine can be a server that corresponds to a destination specified in the connection request (e.g., the resource URI or destination URL in an HTTP request), a honeypot that interacts with the client machine and logs interactions between the querying and target machines, and the like. Alternatively, if the client machine's connection request is rejected, then information capture device 140 can inform the client machine why the connection request has been rejected.

DNS data augmentation system 100 utilizes augmented DNS data 182, query logs 144, and/or data feed 60 to provide reporting 190 of the augmented information associated with the suspicious DNS queries that have been answered, for example, by recursive name server 50, information capture device 140, and any other entity in DNS data augmentation system 100. In various embodiments, recursive name server 50 and central storage 180 can be hosted and located on one or more cloud-based networks and resources and/or hosted and located on one or more physical computer systems. Central storage 180 can receive and incorporate data feeds from data feed 60 into augmented DNS data 182. Data feeds can include, for example, DNS information on entities known or suspected to be bad or malicious, such as domains (e.g., bad domains 92, suspect domains 94, new domains 96, suspect canonical or delegation names associated therewith, etc.), DNS query originators, destinations, destination ports, protocol information, protocol-specific or related information, etc., or any combination thereof. Data feed 60 can provide the data feeds on a periodic or continuous basis. FIG. 1 illustrates information capture device 140 as being communicatively coupled to recursive name server 50 and central storage 180 via communication network 70, through which local resolver 30 and recursive name server 50 are also communicatively coupled. However, one skilled in the art would understand that information capture device 140 can be communicatively coupled to central storage 180 and recursive name server 50 via at least one alternative or additional communication network.

Figure 2:
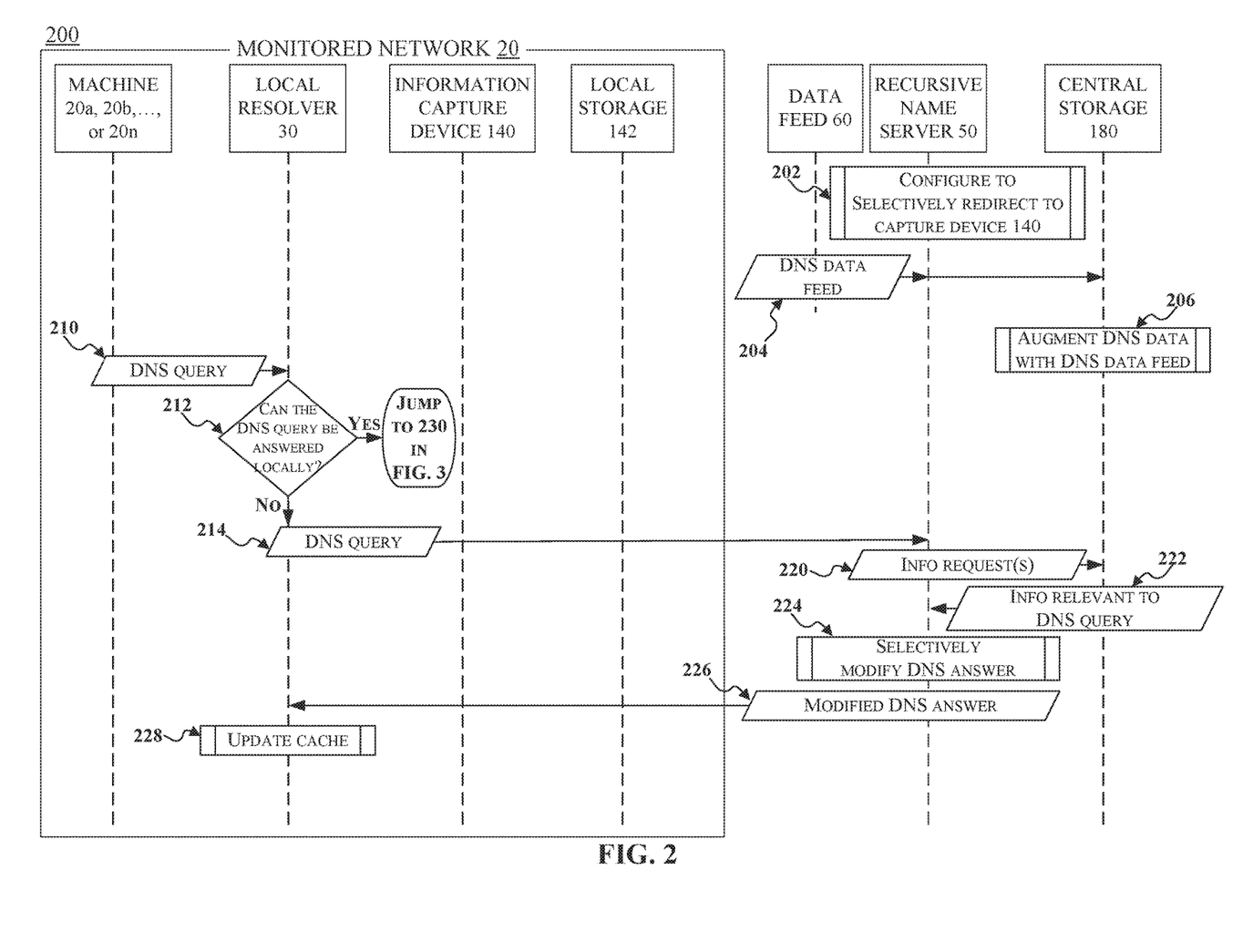
FIGS. 2 and 3 are flow diagrams of example processes performed by the DNS data augmentation system to perform inter-network monitoring and selective redirection of DNS traffic, perform intra-network capture of information associated with network traffic resulting from the redirected DNS traffic, and adaptively manage the network traffic based on the captured information, consistent with the principles of the disclosure.
Figure 3:
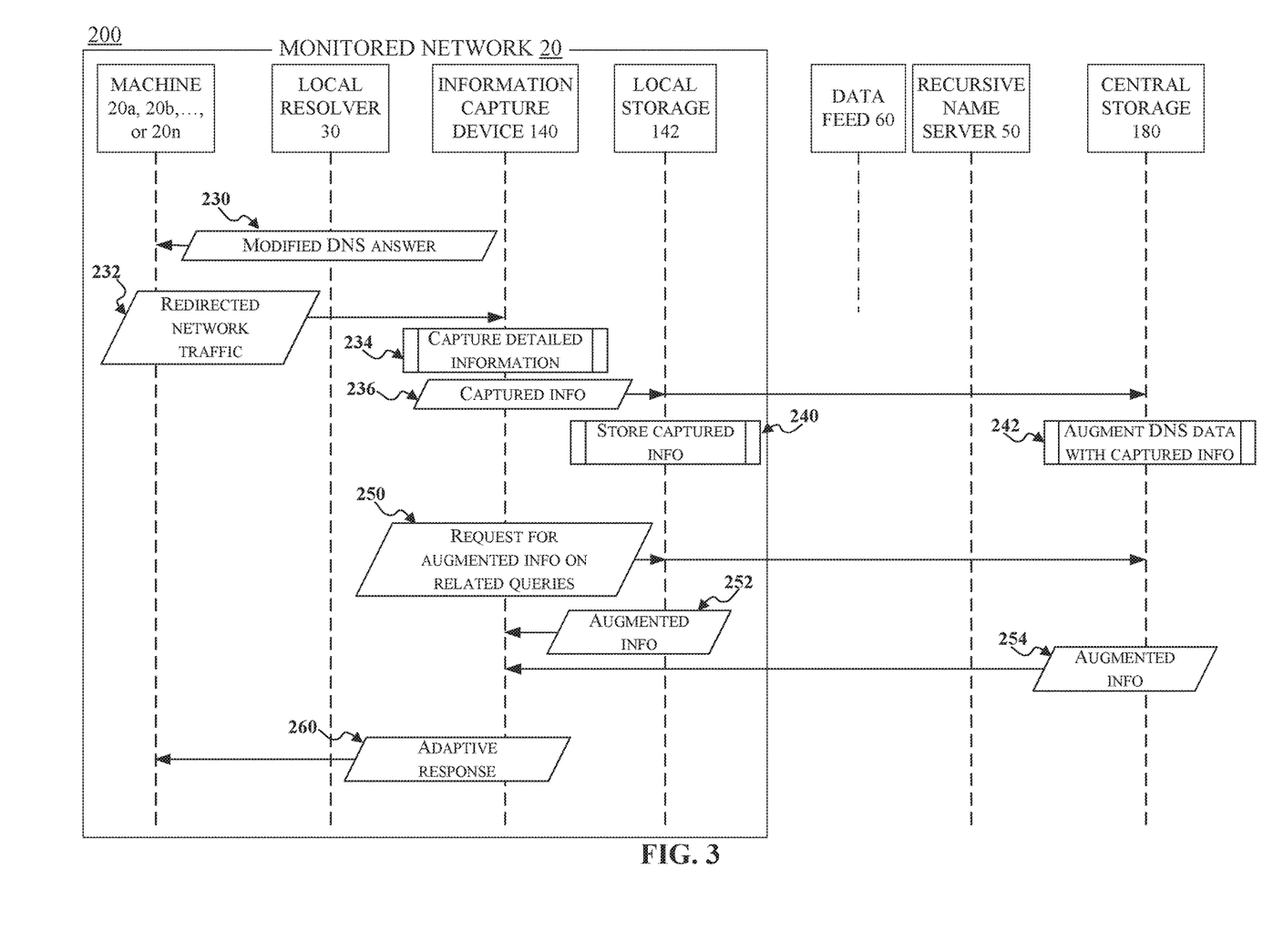

FIGS. 2 and 3 are flow diagrams of examples of a process 200 performed by DNS data augmentation system 100 to perform inter-network monitoring and selective redirection of DNS traffic, perform intra-network capture of information associated with network traffic resulting from the redirected DNS traffic, and adaptively manage the network traffic based on the captured information, consistent with the principles of the disclosure. The illustrated stages of process 200 are examples and any of the illustrated stages can be removed, additional stages can be added, and the order of the illustrated stages can be changed.

Figure 4:
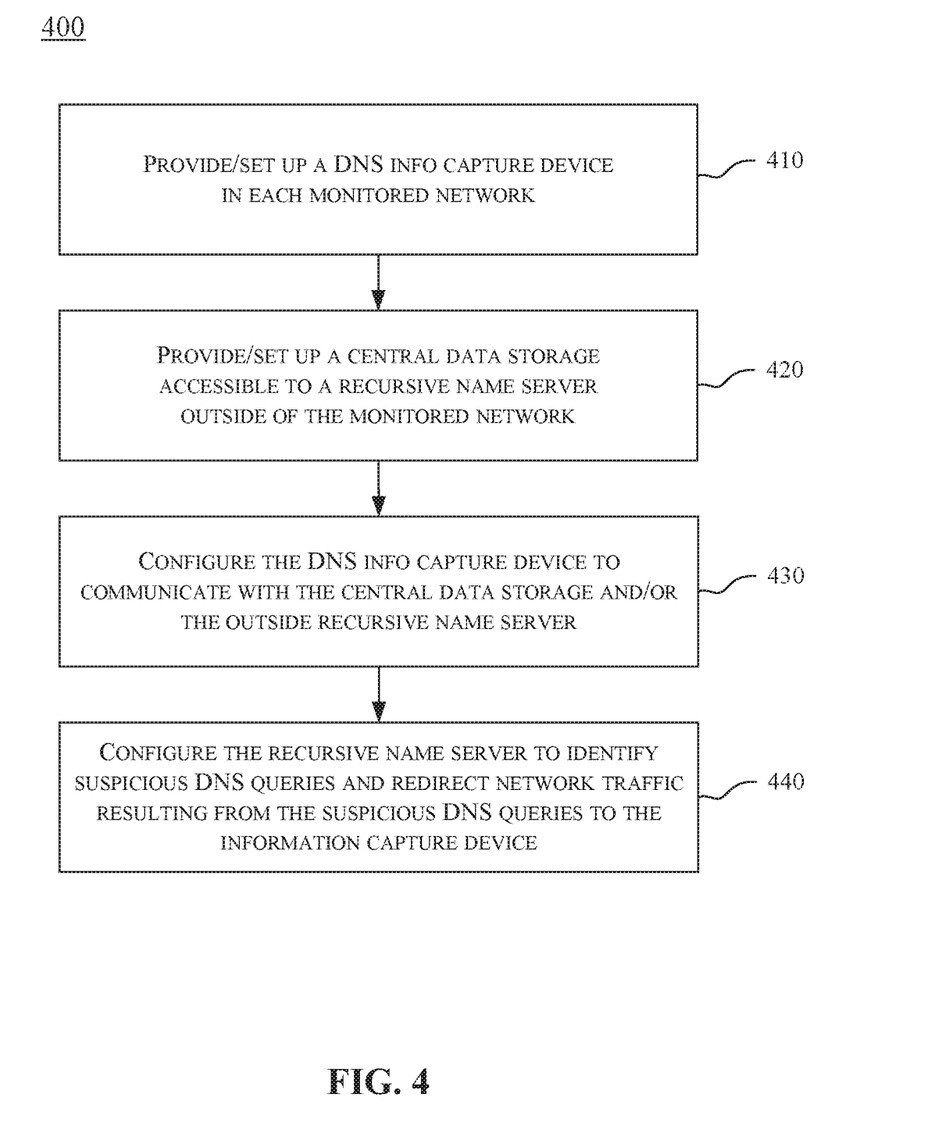
FIG. 4 is a flow diagram of an example process performed for configuring the DNS data augmentation system, consistent with the principles of the disclosure.

After process 200 initiates, in stage 202, DNS data augmentation system 100 configures recursive name server 50, via an example configuration process 400 as illustrated in FIG. 4 and described in greater detail below, to identify which DNS queries are suspicious and selectively redirect network traffic resulting from suspicious DNS queries to information capture device 140. Next, in stage 204, one or more DNS data feeds, such as lists of questionable domain names, are provided to recursive name server 50 and/or central storage 180. The DNS data feeds can be provided by data feed 60, the administrator of monitored network 15, local storage 142, and the like. Then, in stage 206, DNS data augmentation system 100 utilizes the DNS data feeds to augment DNS data (e.g., augmented DNS data 182) useful for identifying suspicious DNS queries.

In stage 210, a client machine of machines 10a-n originates a DNS query seeking to resolve a domain name and transmits the DNS query to local resolver 30. Next, in stage 212, local resolver 30 determines whether or not the DNS query can be fully answered locally, for example, by local resolver 30 or any other resolver in monitored network 15. If the DNS query is determined to be locally answerable, then process 200 jumps to stage 230 as shown in FIG. 3 and described in greater detail below. Alternatively, if the DNS query is determined to be locally unanswerable, then process 200 proceeds to stage 214, in which local resolver 30 forwards the DNS query to recursive name server 50. In various embodiments, recursive name server 50 is outside of monitored network 15 and serves as a cloud-based resolver, which enables DNS data augmentation system 100 to provide the benefits of a cloud-based DNS resolution service.

In stage 220, subsequent to receiving the DNS query from local resolver 30, recursive name server 50 requests augmented information relevant to the DNS query, and in stage 222, central storage 180 provides relevant augmented information to recursive name server 50. The augmented information includes archived and/or aggregate information relevant to the DNS query. Next, in stage 224, recursive name server 50 deems the DNS query as suspicious, for example, based on an evaluation of the DNS query and the augmented information, and thus selectively modifies a DNS answer that would cause the client machine to redirect network traffic resulting from suspicious DNS query to information capture device 140. Alternatively, if the DNS query is not deemed suspicious (not shown), then recursive name server 50 can respond with an unmodified DNS answer that would not cause the client machine to redirect resulting network traffic to information capture device 140. Then, in stage 226, recursive name server 50 transmits the modified DNS answer to local resolver 30. And in stage 228, local resolver 30 can store the modified DNS answer in a cache for responding to subsequent similar DNS queries seeking to resolve the same domain name.

In stage 230 (as shown in FIG. 3), local resolver 30 transmits the modified DNS answer to the client machine that originated the suspicious DNS query. The modified DNS answer can be obtained from recursive name server 50 or the cache of local resolver 30. Next, in stage 232, the client machine can respond to the modified DNS answer by generating and transmitting redirected network traffic (e.g., one or more connection requests) to information capture device 140, which is in monitored network 15 and can capture detailed information associated with the redirected network traffic with the local scope and granularity of monitored network 15 to provide captured information. Detailed information associated with the redirected network traffic and captured by information capture device 140 includes, for example, originator identifier of the client machine, at least one destination specified in the redirected network traffic, at least one destination port specified in the redirected network traffic, at least one protocol and protocol-specific information specified in the redirected network traffic, at least one timestamp indicating the redirected network traffic's time of origination or transmission, and the like.

Then, in stage 234, information capture device 140 performs one or more intra-network captures of the detailed information associated with the redirected network traffic to provide captured information. DNS data augmentation system 100 can analyze the captured information, data logs (e.g., query logs 144) in local storage 142, and/or the augmented DNS data in central storage 180 to obtain aggregate information associated with the client machine's history of redirected network traffic, such an amount of redirected network traffic from the client machine, timestamps corresponding to the client machine's redirected network traffic, a ratio of the redirected network traffic relative to all network traffic from the client machine, and the like. For example, aggregate information associated with the client machine's history of connection requests redirected to information capture device 140 includes a number of the client machine's redirected connection requests, timestamps indicating when the redirected connection requests were made by the client machine or received by information capture device 140, a redirection ratio of the client machine's connection requests (i.e., how often were the client machine's requests redirected relative to all requests made), and the like. DNS data augmentation system 100 can also identify useful patterns in the redirected network traffic made during multiple timeframes, for example, by comparing the aggregate information associated with redirected network traffic made during the defined timeframe to aggregate information associated with redirected network traffic made during one or more other timeframes. DNS data augmentation system 100 can include the identified useful patterns in the aggregate information associated with the client machine's redirected network traffic.

Next, in stage 236, information capture device 140 can provide the captured information and/or the aggregate information to local storage 142 and/or central storage 180. In stage 240, local storage 142 can update the data logs with the captured information and/or the aggregate information, and in stage 242, central storage 180 can augment the DNS data with the captured information and/or the aggregate information.

In stage 250, information capture device 140 requests augmented information relevant to the DNS query from local storage 142 and/or central storage 180. More particularly, information capture device 140 can send requests for archived and/or aggregate information associated with previously-redirected DNS queries related to the DNS query, and then receive relevant augmented information from local storage 142 in stage 252 and/or central storage 180 in stage 254.

Next, in stage 260, information capture device 140 evaluates the augmented information relevant to the redirected network traffic and adaptively responds to the redirected network traffic. For example, in response to a redirected connection request from the client machine, information capture device 140 can obtain and evaluate augmented information relevant to the connection request. If the connection request is granted, then information capture device 140 can connect with the client machine and a target machine and serve as a suitable type of intermediary between the client and target machines. Information capture device 140 can evaluate the augmented information to select the target machine and/or the suitable intermediary type (e.g., a gateway, a content-filtering proxy server, a honeypot, and the like). The target machine can be a server that corresponds to a destination specified in the connection request (e.g., the resource URI or destination URL in an HTTP request), a honeypot that interacts with the client machine and logs interactions between the querying and target machines, a DNS sinkhole, and the like. Alternatively, if the connection request is rejected, then information capture device 140 can inform the client machine why the connection request has been rejected. Finally, process 200 can return to stage 210 or terminate.

In 222, an answer can be generated and other action can be taken. For example, recursive name server 50 can deem the DNS query as suspicious if the DNS query's originator has been flagged or exceeded a predetermined number (e.g., a threshold) of DNS redirect requests within a predetermined window (e.g., a period, a length, etc.) of time. If the DNS query is deemed suspicious, then recursive name server 50 can log captured information associated with the suspicious DNS query and provide the nature of the suspicious DNS query to a pertinent entity. Recursive name server 50 can flag the DNS query and/or the DNS query's originator, destination, domain name, etc., as suspicious.

FIG. 4 is a flow diagram of an example process 400 performed for configuring DNS data augmentation system 100, consistent with the principles of the disclosure. More particularly, recursive name server 50 can be configured to monitor DNS queries originating in monitored network 15, identify which of the DNS queries are suspicious, selectively modify DNS answers responsive to the DNS queries identified as suspicious, and answer the suspicious DNS queries with the modified DNS answers to redirect network traffic resulting from suspicious DNS queries to information capture device 140. The illustrated stages of the method are examples and any of the illustrated stages can be removed, additional stages can be added, and the order of the illustrated stages can be changed.

After process 400 initiates, in 410, information capture device 140 can be set up in monitored network 15. For example, the administrator of monitored network 15 can provide and set up information capture device 140. In 420, central data storage 180 accessible to recursive name server 50 outside monitored network 15 can be set up. For example, the administrator of monitored network 15 and/or an administrator of recursive name server 50 can set up central storage 180.

In 430, information capture device 140 can be configured to communicate with the central data storage and/or the outside recursive name server. For example, information capture device 140 can be configured with the network address and access information for recursive name server 50 and central storage 180.

In 440, recursive name server 50 can be configured to identify suspicious DNS queries originating in monitored network 15 and redirect only the suspicious DNS queries to information capture device 140. For example, DNS data augmentation system 100 can subscribe recursive name server 50 to data feed 60 for lists of questionable domain names, with which recursive name server 50 can identify suspicious DNS queries. Recursive name server 50 can obtain data from data feeds 60 continuously or periodically prior to receiving the DNS query and store the data in central storage 180 or in real-time as the DNS query is received.

Figure 5:
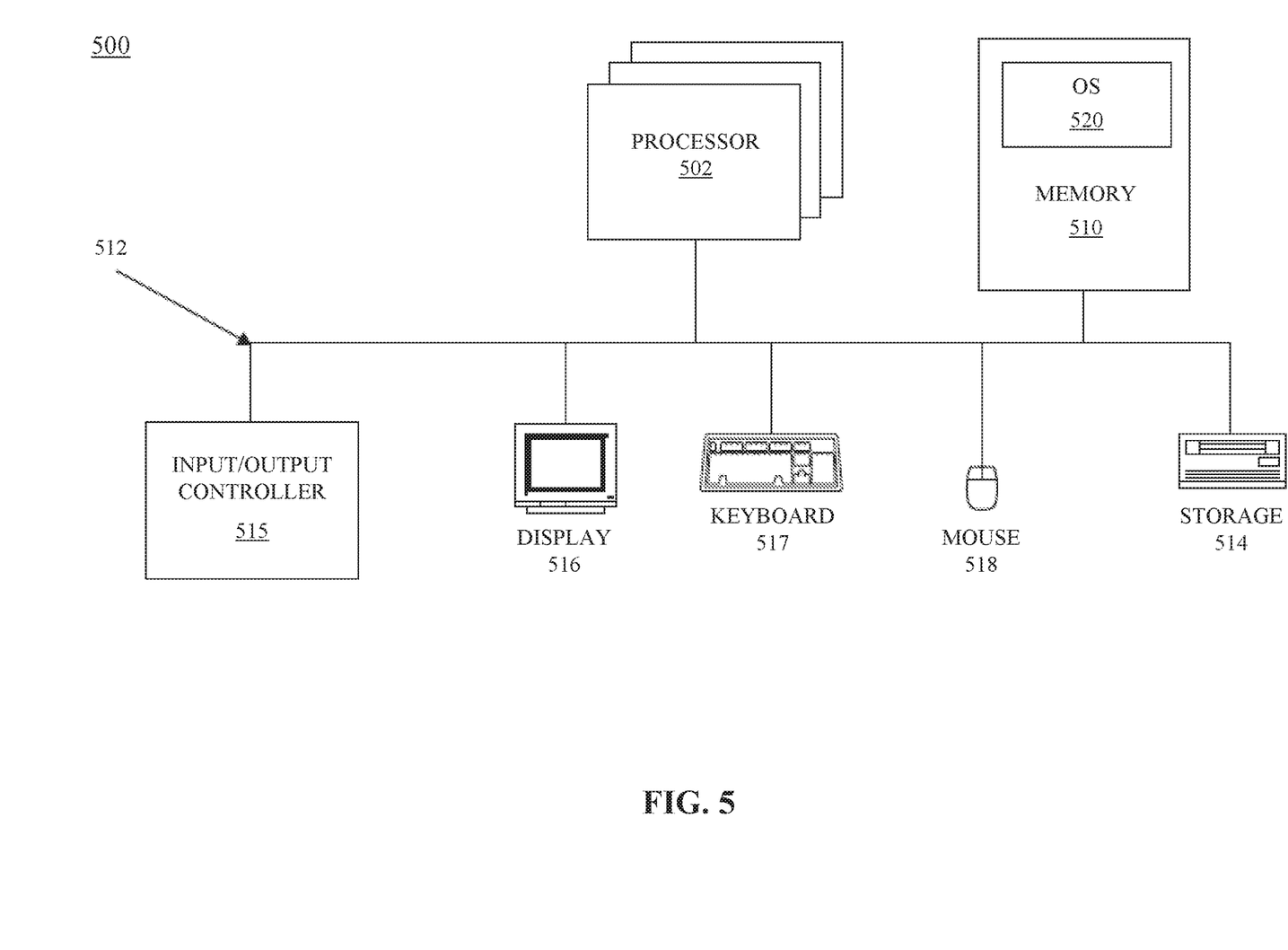
FIG. 5 is a block diagram of an exemplary computing system that may be used to implement embodiments consistent with the principles of the present disclosure.

FIG. 5 shows an exemplary computing system 500 consistent with the principles of the invention. One or more computing systems similar to computing system 500 and/or the entire system as shown in FIG. 5 can be used to implement information capture device 140 as shown in FIG. 1. In some implementations, a database and/or storage 514 can be used to implement local storage 142 and/or central storage 180 as shown in FIG. 1.

Certain embodiments of DNS data augmentation system 100 or information capture device 140 can be implemented or embedded as a computer program. The computer program can exist in a variety of forms both active and inactive. For example, the computer program can exist as software program or programs comprised of program instructions in source code, object code, executable code or other formats; firmware program or programs; or hardware description language ("HDL") files. Any of the above can be embodied on a computer readable medium, which include storage devices and signals, in compressed or uncompressed form. However, for purposes of explanation, the computing system 500 is shown as a general purpose computer that is well known to those skilled in the art. In further embodiments, the computer system can be embodied in one or more specialized computing devices (e.g., a DNS registry) and/or one or more devices specifically designed to perform the systems and methods described herein. Moreover, the components described below can support one or more cloud-based networks for hosting and supporting the systems and processes described herein. Examples of the components that may be included in the computing system 500 will now be described.

As shown, the computing system 500 can include at least one processors 502, a working memory 510, at least one storage 514, one or more input/output ("I/O") devices (e.g., display 516, keyboard 517, mouse 518), and at least one I/O controller 515. The storage 514 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. The various components of the computing system 500 communicate through a system bus 512 or similar architecture. In addition, the computing system 500 can include an operating system ("OS") 520 that resides in the working memory 510 during operation. One skilled in the art will recognize that the processor 502 can include multiple processors. For example, the processor 502 can include multiple copies of the same processor. Alternatively, the processor 502 can include a heterogeneous mix of various types of processors. For example, the processor 502 can use one processor as a primary processor and other processors as co-processors. For another example, the processor 502 can include one or more multi-core processors and one or more single core processors. Thus, the computing system 500 can include any number of execution cores across a set of processors. As to the keyboard, the pointing device, and the display, these components may be implemented using components that are well known to those skilled in the art. One skilled in the art will also recognize that other components and peripherals may be included in the computing system 500.

The OS 520 is an integrated collection of routines and instructions that are responsible for the direct control and management of hardware in the computing system 500 and system operations. Additionally, the OS 520 provides a foundation upon which to run application software and device drivers, such as one or more applications configured to perform embodiments disclosed herein. For example, the OS 520 can perform services, such as resource allocation, scheduling, input/output control, and memory management. The OS 520 can be predominantly software, but can also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The working memory 510 serves as a primary storage area of the computing system 500 and holds data that is actively used by the applications running on processor 502. One skilled in the art will recognize that the applications are software programs that each contains a set of computer instructions for instructing the computing system 500 to perform a set of specific tasks during runtime, and that the term "applications" may be used interchangeably with application software, application programs, device drivers, and/or programs in accordance with embodiments of the present teachings. The working memory 510 can be implemented as a random access memory or other forms of memory as described below, which are well known to those skilled in the art.

The computing system 500 can be connected to a network (not shown) and to a remote computer (not shown) and a database (not shown) via the network. The computing system 500 and/or the entire system shown in FIG. 5 can be used to implement embodiments consistent with the invention.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., the processor 502), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, then the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software and vice versa.

What is claimed is:

1. A system for enhanced monitoring and adaptive management of inter-network Domain Name System (DNS) traffic, comprising:
   an information capture device in a monitored network that includes a client machine,
      wherein the monitored network:
         originates a DNS query to resolve a domain, and
         sends the DNS query to a recursive name server outside of the monitored network,
      wherein the recursive name server:
         receives the DNS query,
         determines that the DNS query seeks to resolve a questionable domain name, and
         responds to the DNS query with a modified DNS answer that redirects the client machine to the information capture device; and
   a data storage accessible by the information capture device, wherein the information capture device includes a processor and non-transitory memory storing instructions that, when executed by the processor, cause the information capture device to perform a method comprising:
      receiving a redirected connection request originated by the client machine in response to the modified DNS answer;
      capturing detailed information associated with the client machine or the redirected connection request to provide captured information, wherein the detailed information was not accessible by the recursive name server when generating the modified DNS answer;
      sending the captured information to the data storage, wherein the data storage, in response to receiving the captured information from the information capture device, updates augmented DNS data that is associated with at least one of the client machine or the redirected connection request with the captured information; and
      providing, in response to the redirected connection request, an adaptive answer to the client machine, wherein the adaptive answer is generated based on the updated augmented DNS data.

2. The system of claim 1, wherein the recursive name server is communicatively coupled to the monitored network via a cloud network, and wherein the recursive name server uses the cloud network to receive the DNS query from the monitored network and provide, in response to the DNS query, the modified DNS answer to the monitored network.

3. The system of claim 1, wherein the recursive name server receives the questionable domain name from at least one of a DNS data feed or input from an administrator of the monitored network.

4. The system of claim 1, wherein the client machine receives the modified DNS answer via a local resolver in the monitored network, and wherein the local resolver caches the modified DNS answer and, in response to a second DNS query seeking to resolve the questionable domain name, provides the modified DNS answer.

5. The system of claim 1, wherein the detailed information includes at least one of:
    a machine identifier uniquely identifying the client machine in the monitored network,
    a destination specified in the redirected connection request,
    a destination port specified in the redirected connection request, or
    protocol-related information specified in the redirected connection request.

6. The system of claim 5, wherein the instructions, when executed by the processor, further cause the information capture device to perform the step of:
    providing the augmented DNS data to the recursive name server,
    wherein the recursive name server:
        determines a second DNS query is a suspicious query based on the augmented DNS data and,
        in response, generates a second modified DNS answer to redirect the client machine to the information capture device.

7. The system of claim 5, wherein the instructions, when executed by the processor, further cause the information capture device to perform the steps of:
    identifying the destination specified in the redirected connection request; and
    tracking a quantity of connection requests made by the client machine to connect to the destination.

8. The system of claim 7, wherein the instructions, when executed by the processor, further cause the information capture device to perform the steps of:
    determining the quantity of connection requests made by the client machine to connect to the destination exceeds a predetermined threshold; and
    flagging the destination as a suspicious destination.

9. The system of claim 8, wherein the instructions, when executed by the processor, further cause the information capture device to perform the steps of:
    providing the adaptive answer to the client machine, wherein the adaptive answer causes the client machine to establish a network connection with the suspicious destination; and
    monitoring network traffic resulting from the network connection.

10. The system of claim 8, wherein the instructions, when executed by the processor, further cause the information capture device to perform the step of:
    providing the adaptive answer to the client machine, wherein the adaptive answer causes the client machine to form a network connection to a honeypot.

11. The system of claim 5, wherein the client machine is one of a plurality of machines in the monitored network, and wherein the instructions, when executed by the processor, further cause the information capture device to perform the steps of:
    identifying the destination specified in the redirected connection request; and
    tracking a quantity of connection requests made by the plurality of machines to connect to the destination.

12. The system of claim 11, wherein the instructions, when executed by the processor, further cause the information capture device to perform the steps of:
    determining that the quantity of connection requests made by the plurality of machines to connect to the destination exceeds a predetermined threshold; and
    flagging the destination as a suspicious destination.

13. A method for enhanced monitoring and adaptive management of inter-network Domain Name System (DNS) traffic, the method comprising:
    receiving, by an information capture device in a monitored network, a redirected connection request originated by a client machine in the monitored network, wherein:
        a recursive name server outside of the monitored network provided a modified DNS answer to a DNS query to resolve a domain,
        the recursive name server determined that the DNS query sought to resolve a questionable domain, and
        the client machine originated the redirected connection request in response to the modified DNS answer;
    capturing, by the information capture device, detailed information associated with the client machine or the redirected connection request to provide captured information, wherein the detailed information was not accessible by the recursive name server when generating the modified DNS answer;
    sending the captured information to a data storage accessible by the information capture device, wherein the data storage, in response to receiving the captured information from the information capture device, updates augmented DNS data that is associated with at least one of the client machine or the redirected connection request with the captured information; and
    providing, by the information capture device in response to the redirected connection request, an adaptive answer to the client machine, wherein the adaptive answer is generated based on the updated augmented DNS data.

14. The method of claim 13, wherein the recursive name server is communicatively coupled to the monitored network via a cloud network, and wherein the recursive name server uses the cloud network to receive a DNS query from the monitored network and provide, in response to the DNS query, the modified DNS answer to the monitored network.

15. The method of claim 13, wherein the detailed information includes at least one of:
    a machine identifier uniquely identifying the client machine in the monitored network,
    a destination specified in the redirected connection request,
    a destination port specified in the redirected connection request, or
    protocol-related information specified in the redirected connection request.

16. The method of claim 15, further comprising providing the updated augmented DNS data to the recursive name server, wherein the recursive name server:
   determines, based on the updated augmented DNS data, that a second DNS query is a suspicious query; and
   generates a second modified DNS answer to redirect the client machine to the information capture device.

17. The method of claim 15, further comprising:
   identifying the destination specified in the redirected connection request;
   tracking a quantity of connection requests made by the client machine to connect to the destination;
   determining the quantity of connection requests made by the client machine to connect to the destination exceeds a predetermined threshold; and
   flagging the destination as a suspicious destination.

18. The method of claim 17, further comprising:
   providing the adaptive answer to the client machine, wherein the adaptive answer causes the client machine to establish a network connection with the suspicious destination; and
   monitoring network traffic resulting from the network connection.

19. One or more non-transitory computer-readable storage media including instructions that, when executed by one or more processors, causes the one or more processors to perform the steps of:
   receiving, by an information capture device in a monitored network, a redirected connection request originated by a client machine in the monitored network, wherein:
      a recursive name server outside of the monitored network provided a modified DNS answer to a DNS query to resolve a domain,
      the recursive name server determined that the DNS query sought to resolve a questionable domain, and
      the client machine originated the redirected connection request in response to the modified DNS answer;
   capturing, by the information capture device, detailed information associated with the client machine or the redirected connection request to provide captured information, wherein the detailed information was not accessible by the recursive name server when generating the modified DNS answer;
   sending the captured information to a data storage accessible by the information capture device, wherein the data storage, in response to receiving the captured information from the information capture device, updates augmented DNS data associated with at least one of the client machine or the redirected connection request with the captured information; and
   providing, by the information capture device in response to the redirected connection request, an adaptive answer to the client machine, wherein the adaptive answer is generated based on the updated augmented DNS data.

* * * * *